United States Patent
Xu et al.

(10) Patent No.: US 6,302,928 B1
(45) Date of Patent: Oct. 16, 2001

(54) ELECTROCHEMICAL CELLS WITH HIGH VOLUMETRIC DENSITY OF ELECTROACTIVE SULFUR-CONTAINING MATERIALS IN CATHODE ACTIVE LAYERS

(75) Inventors: Zhe-Sheng Xu; Terje A. Skotheim; Yordan M. Gernov, all of Tucson, AZ (US)

(73) Assignee: Moltech Corporation, Tucson, AZ (US)

( * ) Notice: Subject to any disclaimer, the term of this patent is extended or adjusted under 35 U.S.C. 154(b) by 0 days.

(21) Appl. No.: 09/215,057

(22) Filed: Dec. 17, 1998

(51) Int. Cl.$^7$ ........................................ H01M 4/60
(52) U.S. Cl. ........................... 29/623.1; 429/213
(58) Field of Search ............................ 429/213; 29/623.1

(56) References Cited

U.S. PATENT DOCUMENTS

| | | |
|---|---|---|
| 3,639,174 | 2/1972 | Kegelman . |
| 4,143,214 | 3/1979 | Chang et al. . |
| 4,152,491 | 5/1979 | Chang et al. . |
| 4,192,913 * | 3/1980 | Koontz et al. ........................ 429/119 |
| 4,303,748 | 12/1981 | Armand et al. . |
| 4,409,168 | 10/1983 | Mrazek et al. . |
| 4,664,991 | 5/1987 | Perichaud et al. . |
| 4,739,018 | 4/1988 | Armand et al. . |
| 4,833,048 | 5/1989 | De Jonghe et al. . |
| 4,917,974 | 4/1990 | De Jonghe et al. . |
| 5,162,175 | 11/1992 | Visco et al. . |
| 5,324,599 | 6/1994 | Oyama et al. . |
| 5,424,147 * | 6/1995 | Khasin et al. ........................ 429/119 |
| 5,441,831 | 8/1995 | Okamoto et al. . |
| 5,460,905 | 10/1995 | Skotheim . |
| 5,478,676 | 12/1995 | Turi et al. . |
| 5,516,598 | 5/1996 | Visco et al. . |
| 5,518,841 * | 5/1996 | Sotomura et al. ................... 429/213 |
| 5,523,179 | 6/1996 | Chu . |
| 5,529,860 | 6/1996 | Skotheim et al. . |
| 5,532,077 | 7/1996 | Chu . |
| 5,538,812 | 7/1996 | Lee et al. . |
| 5,582,623 | 12/1996 | Chu . |
| 5,601,947 | 2/1997 | Skotheim et al. . |
| 5,686,201 | 11/1997 | Chu . |
| 5,690,702 * | 11/1997 | Skotheim et al. ................... 29/623.1 |
| 5,789,108 | 8/1998 | Chu . |
| 5,814,420 | 9/1998 | Chu . |
| 5,919,587 * | 7/1999 | Mukherjee et al. ................... 429/213 |

FOREIGN PATENT DOCUMENTS

| | | |
|---|---|---|
| 250518 B1 | 3/1991 | (EP) . |
| 0 602 984 A2 A3 | 6/1994 | (EP) . |

OTHER PUBLICATIONS

Coleman, J. R. (Sep. 24–26, 1968). "The Sulfur Electrode," Abstract of Proceedings of the 6th International Symposium on Power Sources 2, Sussex, UK, pp. 289–302.

* cited by examiner

*Primary Examiner*—Carol Chaney
(74) *Attorney, Agent, or Firm*—Morrison & Foerster LLP

(57) ABSTRACT

The present invention pertains to methods of forming solid composite cathodes with cathode active layers which comprise an electroactive sulfur-containing material and an electrically conductive material, wherein the electroactive sulfur-containing material is heated to a temperature above its melting point to form a melt layer and then is resolidified to form a cathode active layer having redistributed electroactive sulfur-containing material of high volumetric density and improved adhesion and cohesion. The present invention also pertains to methods of forming electric current producing cells comprising such solid composite cathodes and having a high electrochemical utilization and to solid composite cathodes and electric current producing cells formed using such methods.

51 Claims, No Drawings

ELECTROCHEMICAL CELLS WITH HIGH VOLUMETRIC DENSITY OF ELECTROACTIVE SULFUR-CONTAINING MATERIALS IN CATHODE ACTIVE LAYERS

TECHNICAL FIELD

The present invention pertains generally to the field of cathodes and electric current producing cells. More particularly, the present invention pertains to methods of forming solid composite cathodes with cathode active layers which comprise an electroactive sulfur-containing material and an electrically conductive material, wherein the electroactive sulfur-containing material is heated to a temperature above its melting point and then the melted electroactive sulfur-containing material is resolidified to form a cathode active layer having redistributed sulfur-containing material of high volumetric density. The present invention also pertains to methods of forming electric current producing cells comprising such solid composite cathodes and having a high electrochemical utilization, and to solid composite cathodes and electric current producing cells formed using such methods.

BACKGROUND

Throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

An electroactive material that has been fabricated into a structure for use in a battery is referred to as an electrode. Of a pair of electrodes used in a battery, herein referred to as an electric current producing cell, the electrode on the electrochemically higher potential side is referred to as the positive electrode, or the cathode, while the electrode on the electrochemically lower potential side is referred to as the negative electrode, or the anode.

An electrochemically active material used in the cathode or positive electrode is referred to hereinafter as a cathode active material. An electrochemically active material used in the anode or negative electrode is hereinafter referred to as an anode active material. An electric current producing cell or battery comprising a cathode with the cathode active material in an oxidized state and an anode with the anode active material in a reduced state is referred to as being in a charged state. Accordingly, an electric current producing cell comprising a cathode with the cathode active material in a reduced state, and an anode with the anode active material in an oxidized state, is referred to as being in a discharged state.

As the evolution of batteries continues, and particularly as lithium batteries become more widely accepted for a variety of uses, the need for safe, long lasting, high energy density, and light weight batteries becomes more important. There has been considerable interest in recent years in developing high energy density cathode active materials and alkali metals as anode active materials for high energy primary and secondary batteries.

To achieve high capacity in electric current producing cells or batteries, it is desirable to have a high quantity or loading of electroactive material in the cathode active layer. For example, the volume of the cathode active layer in an AA size battery is typically about 2 cm$^3$. If the specific capacity of the electroactive material is a very high value, such as 1000 mAh/g, the amount or volumetric density of the electroactive material in the cathode active layer would need to be at least 500 mg/cm$^3$ in order to have the 1 gram of cathode active material in the AA size battery necessary to provide a capacity of 1000 mAh. If the volumetric density of electroactive material in the cathode active layer can be increased to higher levels, such as greater than 900 mg/cm$^3$, the capacity of the battery may be proportionately increased to higher levels if the specific capacity of the electroactive material does not decrease significantly when the cathode active layer becomes denser and less porous.

There are a wide variety of electroactive materials that may be utilized in the cathode active layers of electric current producing cells. For example, a number of these are described in copending U.S. patent application Ser. No. 08/859,996, to Mukherjee et al. to the common assignee. These electroactive materials vary widely in their specific densities (g/cm$^3$) and in their specific capacities (mAh/g) so the desired volumetric densities in mg/cm$^3$ of the electroactive material in the cathode active layer correspondingly vary over a wide range. Lithium and sulfur are highly desirable as the electrochemically active materials for the anode and cathode, respectively, of electric current producing cells because they provide nearly the highest energy density possible on a weight or volume basis of any of the known combinations of active materials. To obtain high energy densities, the lithium may be present as the pure metal, in an alloy, or in an intercalated form, and the sulfur may be present as elemental sulfur or as a component in an organic or inorganic material with a high sulfur content, preferably above 75 weight percent sulfur. For example, in combination with a lithium anode, elemental sulfur has a specific capacity of 1680 mAh/g, and sulfur-containing polymers with trisulfide and longer polysulfide groups in the polymers have shown specific capacities of more than 1200 mAh/g. These high specific capacities are particularly desirable for applications, such as portable electronic devices and electric vehicles, where low weight of the battery is important.

Herein, the term "sulfur-containing polymers" pertains to polymers comprising sulfur-sulfur bonds forming trisulfide (—S—S—S—) and higher polysulfide linkages. These sulfur-containing polymers comprise, in their oxidized state, a polysulfide moiety, $S_m$, selected from the group consisting of covalent —$S_m$— moieties, ionic —$S_m^-$ moieties, and ionic $S_m^{2-}$ moieties, wherein m is an integer equal to or greater than 3. For example, sulfur-containing polymers comprising covalent —$S_m$— moieties are described in U.S. Pat. Nos. 5,601,947; 5,690,702; 5,529,860; and copending U.S. Patent application Ser. No. 08/602,323, all to Skotheim et al. Sulfur-containing polymers comprising ionic —$S_m^-$ moieties are described in U.S. Pat. No. 4,664,991 to Perichaud et al. Also, for example, sulfur-containing polymers comprising ionic $S_m^-$ moieties are described in the aforementioned U.S. Pat. No. 4,664,991 and in European Patent No. 250,518 B 1 to Genies. Organo-sulfur materials with only disulfide (—S—S—) moieties typically show specific capacities only in the range of 300 to 700 mAh/g and are accordingly much less desirable for those applications requiring high specific capacities.

It is known to those skilled in the art of battery design and fabrication that practical battery cells comprising the electroactive cathode and anode materials also typically contain other non-electroactive materials such as a container, current collectors, separator, and electrolyte, in addition to polymeric binders, electrically conductive additives, and other additives in the electrodes. The electrolyte is typically an aqueous or nonaqueous liquid, gel, or solid material containing dissolved salts or ionic compounds with good ionic conductance, but with poor electronic conductivity. All of these additional non-electroactive components are typically utilized to make the battery perform efficiently, but they also serve to reduce the gravimetric and volumetric energy density of the cell. It is, therefore, desirable to keep the quantities of these non-electroactive materials to a minimum so as to maximize the amount of electroactive material in the battery cell.

To achieve the highest possible volumetric density of the electroactive material in the cathode active layer, it is desirable to maximize the weight percent for electroactive materials in the cathode active layer, for example, 65 to 85 weight percent of electroactive materials of a specific density of about 2 $g/cm^3$, such as most high energy density sulfur-containing materials have, and to maintain the porosity or air voids in the cathode active layer as low as possible, for example, in the range of 30 to 60 volume percent. Particularly, the porosity of the cathode active layer must be kept low because higher porosities, such as, for example, 70 to 85 volume percent, do not provide enough electroactive material to obtain very high cell capacities. With the electroactive transition metal oxides, this desirable low porosity is often relatively easy to achieve because these oxides typically have electrically conductive properties and are typically microporous so that high levels of added conductive fillers and microporous additives are not required.

However, with electroactive sulfur-containing materials, which typically have much higher specific capacities than the electroactive transition metal oxides, it is difficult to obtain efficient electrochemical utilization of the sulfur-containing materials at high volumetric densities because the sulfur-containing materials are highly electrically non-conducting or insulative and are generally not microporous. For example, U.S. Pat. Nos. 5,523,179; 5,532,077; 5,582,623; 5,686,201; 5,789,108; and 5,814,420; to Chu, describe the problems of overcoming the insulating character of elemental sulfur in composite cathodes and the use of a homogeneous distribution of an electronically conductive material, such as carbon black, and of an ionically conductive material together with the elemental sulfur in the composite cathode to try to overcome these problems. To retain the homogeneous distribution of the particles and ionically conductive material, the cathode coatings in the above-mentioned patents to Chu are described as being dried in such a manner that the electrode components do not significantly redistribute, such as, for example, by evaporation of the volatile liquids from the cathode coatings at room temperature as, for example, also described in the examples of the aforementioned patents to Chu. The preferred amounts of ionically conductive material, such as polyethylene oxide with an ionic salt, in the cathode active layer in the above-mentioned patents to Chu are 15 to 75 percent by weight in order to achieve at least a 5% electrochemical utilization of the elemental sulfur. All of the examples in the above- mentioned patents to Chu contain either 45% or 50% by weight of elemental sulfur in the cathode active layer. Although the weight per $cm^2$ of the cathode active layer is reported in some of these examples, it is not possible to calculate the volumetric density of elemental sulfur in the cathode active layer because the thickness of the cathode active layer is not reported for any of the examples. Thus, although the volumetric density of elemental sulfur in the cathode active layer in the examples in the aforementioned patents to Chu is not reported, it is likely to be lower than 500 $mg/cm^3$ due to the relatively low amount of elemental sulfur in the cathode active layer and the relatively large amount of ionically conductive material in the cathode active layer. Because of its lower specific density than elemental sulfur, ionic conductive materials, such as polyethylene oxide with lithium salts, occupy a greater volume percent of the cathode active layer than their weight percent value and tend to increase the thickness of the cathode active layer and thus fuirther lower the volumetric density of the elemental sulfur in the cathode active layer. Similarly, U.S. Pat. No. 4,664,991 to Perichaud et al. describes sulfur-containing polymers comprising ionic —$S_m^-$ moieties with a linear conductive polymer backbone in cathode active layers where a high electrochemical utilization, such as a specific capacity of about 1000 mAh/g, was achieved with less than 50 weight percent of the sulfur-containing polymer in the cathode active layer. The weight per cent of the sulfur-containing polymer was reduced below the 50 percent by weight level by the addition of undisclosed amounts of either a polytetraethylene polymer or a blend of polyethylene oxide and a lithium salt into the composition of the cathode active layer. The '991 patent only reports the weight per $cm^2$ of the cathode active layer and does not report its thickness so that it is not possible to calculate the volumetric density of the electroactive sulfur-containing polymer in the cathode active layer. Also, the '991 patent does not report the drying conditions for the coating of the cathode active layer.

To overcome the insulative properties of electroactive sulfur-containing materials, large amounts of electrically conductive fillers, such as conductive carbons, are typically added to the cathode active layer. Typically, the electrically conductive fillers are present in the amounts of about 5 to 40% by weight of the cathode active layer. For example, U.S. Pat. No. 3,639,174 to Kegelman describes solid composite cathodes comprising elemental sulfur and a particulate electrical conductor. U.S. Pat. No. 4,303,748 to Armand et al. describes solid composite cathodes containing an ionically conductive polymer electrolyte together with elemental sulfur, transition metal salts, or other cathode active materials for use with lithium or other anode active materials. U.S. Pat. No. 5,460,905 to Skotheim describes the use of p-doped conjugated polymers, together with an effective amount of conductive carbon pigments, for the transport of electrons in sulfur-based cathodes. U.S. Pat. No. 5,529,860 and U.S. patent application Ser. No. 08/602,323, both to Skotheim et al., describe the use of conductive carbons and graphites, conductive polymers, and metal fibers, powders, and flakes with electroactive sulfur-containing materials comprising covalent —$S_m^-$ moieties , wherein m is an integer equal to or greater than 3.

It would be advantageous to significantly increase the volumetric densities of cathode active layers comprising electroactive sulfur-containing materials without sacrificing the high specific capacity of these materials, i.e., without reducing the desired high electrochemical utilization, such as, for example, greater than 50% utilization, during cycling of the cells. Particularly as the thickness of the cathode active layer is increased, it becomes progressively more difficult to achieve the electrical conductivity and the microporosity needed for highly efficient electrochemical utilization of the sulfur-containing materials. For example, it would be very beneficial to the capacity of batteries if the volumetric density of the cathode active layer, when the layer has a desired loading of electroactive sulfur-containing material in $mg/cm^2$ and the desired high electrochemical utilization, could be increased by a factor of 50% or 100% or even more than 100% from the volumetric densities of 400 $mg/cm^3$ or less which are typical, for example, of cathode active layers comprising 50% by weight of elemental sulfur, 5 to 40% by weight of conductive fillers, and 5 to 40% by weight of ionically conductive materials, polymeric binders, and other non-electroactive materials.

One method to increase the volumetric density of the cathode active layer is by compressing or calendering the layer to a reduced thickness. It would be very advantageous to be able to compress or calender the cathode active layer to a 20% or greater reduction in thickness without sacrificing the desired high electrochemical utilization of the electroactive sulfur-containing materials. This is difficult to achieve when the high levels of non-electroactive materials are present in the cathode active layer, particularly when polymeric binders and any ionically conductive materials are present which typically also provide binding properties to the cathode active layer, such that the electrochemical utilization, as expressed in the specific capacity of the electroactive sulfur-containing material in the cell, is typically significantly reduced when the cathode active layer is reduced in thickness by compressing or calendering. On the other hand, significantly reducing the levels of the non-electroactive materials in the cathode active layer, particularly those materials with binding properties, greatly reduces the mechanical integrity and cohesive and adhesive properties of the cathode active layer. Elemental sulfur and sulfur-containing polymers comprising a polysulfide moiety are typically present in the cathode active layer as particles that do not have binding or film-forming properties so that polymeric binders, including ionically conductive materials, are typically added to provide the cohesion and adhesion properties to the cathode active layer needed for mechanical integrity during the manufacturing and use of the batteries comprising the cathode active layer.

Despite the various approaches proposed for the fabrication of high energy density rechargeable cells comprising elemental sulfur or other electroactive sulfur-containing materials, there remains a need for improved solid composite cathodes comprising a cathode active layer which has a combination of high electrochemical utilization at a high volumetric density of the electroactive sulfur-containing material, while retaining or improving the desirable properties of electrical conductivity, mechanical strength, the ability to be compressed without any significant mechanical damage, cohesive strength, and adhesion to the adjacent layers in the solid composite cathodes utilizing electroactive sulfur-containing materials, such as, for example, elemental sulfur and sulfur-containing polymers comprising a polysulfide moiety.

SUMMARY OF THE INVENTION

One aspect of the present invention pertains to methods of forming a solid composite cathode for use in an electric current producing cell, wherein said methods comprise the steps of: (a) dispersing or suspending an electroactive sulfur-containing material and an electrically conductive material in a liquid medium to form a liquid mixture; (b) casting said liquid mixture formed in step (a) onto a substrate to form a cast layer; (c) removing some or all of said liquid medium from said cast layer formed in step (b) to form a dried layer on said substrate; (d) melting said electroactive sulfur-containing material in said dried layer by heating to a temperature above the melting point of said electroactive sulfur-containing material to form a melt layer; and, (e) resolidifying said melted electroactive sulfur-containing material formed in step (d) to form a cathode active layer having redistributed electroactive sulfur-containing material, wherein said redistributed electroactive sulfur-containing material is present in said cathode active layer at a volumetric density of greater than 500 mg/cm$^3$. In one embodiment of the methods of forming a solid composite cathode of this invention, said liquid mixture formed in step (a) and said cathode active layer formed in step (e) do not comprise a polymeric binder. In one embodiment, said liquid mixture formed in step (a) and said cathode active layer formed in step (e) do not comprise an ionically conductive material.

In one embodiment of the methods of forming a solid composite cathode of the present invention, prior to step (d), said dried layer of step (c) is compressed by calendering. In one embodiment, prior to step (e), said melt layer of step (d) is compressed by calendering. In one embodiment, after forming said redistributed sulfur-containing material in step (e), there is a further step of compressing said cathode active layer.

In one embodiment of the methods of forming a solid composite cathode of this invention, said redistributed electroactive sulfur-containing material is present in an amount of 60 to 95 percent by weight of said cathode active layer. In one embodiment, said redistributed electroactive sulfur-containing material is present in an amount of 65 to 90 percent by weight of said cathode active layer. In one embodiment, said redistributed electroactive sulfur-containing material is present in an amount of 70 to 85 percent by weight of said cathode active layer.

In one embodiment of the methods of forming a solid composite cathode of the present invention, said redistributed electroactive sulfur-containing material is present in said cathode active layer at a volumetric density of greater than 700 mg/cm$^3$, and, preferably, greater than 1000 mg/cm$^3$, and, most preferably, greater than 1500 mg/cm$^3$.

In one embodiment of the methods of forming a solid composite cathode of this invention, said electroactive sulfur-containing material comprises elemental sulfur. In one embodiment, said electroactive sulfur-containing material comprises a sulfur-containing polymer comprising a polysulfide moiety, $S_m$, selected from the group consisting of: covalent —$S_m$— moieties, ionic —$S_m$— moieties, and ionic $S_m^{2-}$ moieties, wherein m is an integer equal to or greater than 3. In one embodiment, m of the polysulfide moiety, $S_m$, of said sulfur-containing polymer is an integer equal to or greater than 8. In one embodiment, said sulfur-containing polymer has a polymer backbone chain and said polysulfide moiety, $S_m$, is covalently bonded by one or both of its terminal sulfur atoms on a side group to said polymer backbone chain. In one embodiment, said sulfur-containing polymer has a polymer backbone chain and said polysulfide moiety, $S_m$, is incorporated into said polymer backbone chain by covalent bonding of terminal sulfur atoms of said polysulfide moiety. In one embodiment, said sulfur-containing polymer comprises greater than 75 weight percent of sulfur.

In one embodiment of the methods of forming a solid composite cathode of the present invention, the temperature to which said electroactive sulfur-containing material is heated for melting in step (d) is greater than 120° C. In one embodiment, the temperature to which said electroactive sulfur-containing material is heated for melting in step (d) is greater than 140° C. In one embodiment, the temperature to which said electroactive sulfur-containing material is heated for melting in step (d) is greater than 160° C.

In one embodiment of the methods of forming a solid composite cathode of this invention, said electrically conductive material is selected from the group consisting of:

conductive carbons, conductive graphites, electrically conductive polymers, electrically conductive metal chalcogenides, carbon nanofibers, active carbon fibers, metal particles, metal fibers, and metal flakes.

In one embodiment of the methods of forming a solid composite cathode of this invention, said liquid mixture formed in step (a) and said cathode active layer formed in step (e) further comprise an organic polymeric binder. In one embodiment, said polymeric binder is present in an amount less than 10 percent by weight of said cathode active layer. In one embodiment, said polymeric binder is present in an amount less than 6 percent by weight of said cathode active layer. In one embodiment, said polymeric binder is present in an amount less than 3 percent by weight of said cathode active layer.

In one embodiment of the methods of forming a solid composite cathode of the present invention, said liquid mixture formed in step (a) and said cathode active layer formed in step (e) further comprise an ionically conductive material. In one embodiment, said ionically conductive material is present in an amount less than 10 percent by weight of said cathode active layer. In one embodiment, said ionically conductive material is present in an amount less than 6 percent by weight of said cathode active layer. In one embodiment, said ionically conductive material is present in an amount less than 3 percent by weight of said cathode active layer.

Another aspect of this invention pertains to a solid composite cathode for use in an electric current producing cell, wherein said cathode is formed by the methods of the present invention, as described herein.

Still another aspect of the present invention pertains to methods of forming an electric current producing cell, wherein said methods comprise the steps of: (i) providing an anode; (ii) providing a solid composite cathode formed by the methods of this invention, as described herein; and, (iii) interposing an electrolyte between said anode and said cathode.

Yet another aspect of this invention pertains to an electric current producing cell comprising: (a) an anode; (b) a solid composite cathode, wherein said cathode is formed by the methods of the present invention, as described herein; and, (c) an electrolyte interposed between said anode and said cathode. In one embodiment, the cathode active layer of said cathode does not comprise a polymeric binder. In one embodiment, the cathode active layer of said cathode does not comprise an ionically conductive material.

In one embodiment of the electric current producing cells of the present invention, said cathode active layer, upon discharge, has a volumetric capacity greater than 500 mAh/$cm^3$. In one embodiment, said cathode active layer, upon discharge, has a volumetric capacity greater than 600 mAh/$cm^3$. In a preferred embodiment, said cathode active layer, upon discharge, has a volumetric capacity greater than 700 mAh/$cm^3$, and, more preferably, greater than 900 mAh/$cm^3$, and, most preferably, greater than 1100 mAh/$cm^3$.

Examples of suitable anode active materials for use in the anodes of the cells of the present invention include, but are not limited to, lithium metal, lithium-aluminum alloys, lithium-tin alloys, lithium-intercalated carbons, and lithium-intercalated graphites.

Examples of suitable electrolytes for use in the cells of the present invention include, but are not limited to, liquid electrolytes, gel polymer electrolytes, and solid polymer electrolytes.

In a preferred embodiment, the electrolyte for the cells of this invention comprises one or more ionic electrolyte salts and one or more electrolyte solvents selected from the group consisting of: N-methyl acetamide, acetonitrile, carbonates, sulfolanes, sulfones, N-alkyl pyrrolidones, dioxolanes, aliphatic ethers, cyclic ethers, glymes, and siloxanes.

In a preferred embodiment, the electrolyte comprises one or more ionic electrolyte salts and one or more polymers selected from the group consisting of: polyethers, polyethylene oxides, polypropylene oxides, polyimides, polyphosphazenes, polyacrylonitriles, polysiloxanes; derivatives of the foregoing; copolymers of the foregoing; and blends of the foregoing.

As one of skill in the art will appreciate, features of one embodiment and aspect of the invention are applicable to other embodiments and aspects of the invention.

DETAILED DESCRIPTION OF THE INVENTION

One aspect of the present invention pertains to a solid composite cathode for use in an electric current producing cell, wherein a cathode active layer of the solid composite cathode comprises an electroactive sulfur-containing material and an electrically conductive material, wherein the electroactive sulfur-containing material is melted by heating to a temperature above its melting point to form a melt layer and then resolidified to form a cathode active layer having redistributed electroactive sulfur-containing material, and wherein said redistributed electroactive sulfur-containing material is present in said cathode active layer at a volumetric density of greater than 500 mg/$cm^3$.

Another aspect of the present invention pertains to a solid composite cathode for use in an electric current producing cell, wherein a cathode active layer of the solid composite cathode comprises an electroactive sulfur-containing material and an electrically conductive material, wherein said electroactive sulfur-containing material is melted by heating to a temperature above its melting point to form a melt layer and then resolidified to form a cathode active layer having redistributed electroactive sulfur-containing material, and wherein said redistributed electroactive sulfur-containing material is present in said cathode active layer at a volumetric density of greater than 500 mg/$cm^3$ and further wherein said cathode active layer does not comprise a polymeric binder.

Another aspect of the present invention pertains to a solid composite cathode for use in an electric current producing cell, wherein a cathode active layer of the solid composite cathode comprises an electroactive sulfur-containing material and an electrically conductive material, wherein said electroactive sulfur-containing material is melted by heating to a temperature above its melting point to form a melt layer and then resolidified to form a cathode active layer having redistributed electroactive sulfur-containing material, and wherein said redistributed electroactive sulfur-containing material is present in said cathode active layer at a volumetric density of greater than 500 mg/$cm^3$ and said cathode active layer does not comprise an ionically conductive material.

The solid composite cathodes of the present invention are particularly preferred for use in electrolytic cells, rechargeable batteries, fuel cells, and the like, which comprise electroactive sulfur-containing cathode materials and which require high energy density while maintaining acceptable mechanical integrity, cohesion, and adhesion of the cathode active layers throughout the manufacturing and use of the cells and batteries.

Electroactive Sulfur-Containing Materials

The term "electroactive sulfur-containing material," as used herein, relates to cathode active materials which comprise the element sulfur in any form, wherein the electrochemical activity involves the breaking or forming of sulfur-sulfur covalent bonds.

In one embodiment, the electroactive sulfur-containing material comprises elemental sulfur.

In one embodiment, the electroactive sulfur-containing material is organic, that is, it comprises both sulfur atoms and carbon atoms.

In one embodiment, the electroactive sulfur-containing material is polymeric. In one embodiment, the sulfur-containing material comprises a sulfur-containing polymer comprising a polysulfide moiety, $S_m$, selected from the group consisting of covalent —$S_m$— moieties, ionic $S_m^{31}$ moieties, and ionic $S_m^{2-}$ moieties, wherein m is an integer equal to or greater than 3. In one embodiment, m of the polysulfide moiety, $S_m$, of the sulfur-containing polymer is an integer equal to or greater than 8. In one embodiment, said sulfur-containing polymer has a polymer backbone chain and said polysulfide moiety, $S_m$, is covalently bonded by one or both of its terminal sulfur atoms on a side group to said polymer backbone chain. In one embodiment, said sulfur-containing polymer has a polymer backbone chain and said polysulfide moiety, $S_m$, is incorporated by covalent bonding of terminal sulfur atoms of said polysulfide moiety. In one embodiment, the sulfur-containing polymer comprises greater than 75 weight percent of sulfur.

The nature of the electroactive sulfur-containing materials useful in the practice of this invention may vary widely. The electroactive properties of elemental sulfur and of sulfur-containing materials are well known in the art, and include the reversible formation of lithiated or lithium ion sulfides during the discharge or cathode reduction cycle of the battery cell.

Examples of electroactive sulfur-containing polymers include, but are not limited to, those comprising one or more carbon-sulfur polymers of general formula $(CS_x)_n$ and $(C_2S_z)_n$. Compositions comprising the general formula —$(CS_x)_n$— (formula I), wherein x ranges from 1.2 to 2.3, and n is an integer equal to or greater than 2, are described in U.S. Pat. No. 5,441,831 to Okamoto et al. Additional examples include those wherein x ranges from greater than 2.3 to about 50, and n is equal to or greater than 2, as described in U.S. Pat. Nos. 5,601,947 and 5,690,702 to Skotheim et al. Additional examples of electroactive sulfur-containing polymers include those compositions comprising the general formula —$(C_2S_z)$— (formula II) wherein z ranges from greater than 1 to about 100, and n is equal to or greater than 2, as described in U.S. Pat. No. 5,529,860 and copending U.S. patent application Ser. No. 08/602,323 to Skotheim et al. of the common assignee.

The preferred materials of general formulae I and II, in their oxidized state, comprise a polysulfide moiety of the formula, —$S_m$—, wherein m is an integer equal to or greater than 3, or more preferably, wherein m is an integer from 3 to 10. In one embodiment, m is an integer from 3 to 6. In one embodiment, m is an integer from 3 to 8. In one embodiment, m is an integer from 6 to 10. In one embodiment, m is an integer from 8 to 10. In one embodiment, the polysulfide linkage comprises —S—S—S— (ie., trisulfide). In one embodiment, the polysulfide linkage comprises —S—S—S—S— (i.e., tetrasulfide). In one embodiment, the polysulfide linkage comprises —S—S—S—S—S— (i.e., pentasulfide). In one embodiment, the polysulfide linkage comprises —S—S—S—S—S—S— (i.e., hexasulfide). In one embodiment, the polysulfide linkage comprises —S—S—S—S—S—S—S— — (i.e., heptasulfide). In one embodiment, the polysulfide linkage comprises —S—S—S—S—S—S—S—S — (i.e., octasulfide).

The polymer backbone chain of electroactive sulfuir-containing polymers may comprise polysulfide —$S_m$— main chain linkages as well as covalently bound —$S_m$— side groups. Owing to the presence of multiple linked sulfur atoms, —$S_m$—, where m is an integer equal to or greater than 3, in these materials, they possess significantly higher energy densities than corresponding materials containing the disulfide linkage, —S—S—, alone.

Other preferred electroactive sulfur-containing polymers are those comprising carbocyclic repeat groups, as described in copending U.S. patent application Ser. No. 08/995,112, to Gorkovenko et al. of the common assignee.

Other examples of electroactive sulfuir-containing polymers comprising a polysulfide moiety, $S_m$, where m is an integer that is equal to or greater than 3, are those containing electron conducting polymers and at least one polysulfti-rated chain forming a complex with the polymer, as described in U.S. Pat. No. 4,664,991 to Perichaud et al.

Other examples of electroactive sulfur-containing polymers include organo-sulfur materials comprising disulfide linkages, although their low specific capacity compared to the corresponding materials containing polysulfide linkages makes it highly difficult to achieve the desired high capacities in electric current producing cells. However, they may also be utilized in a blend in the cathode active layer with elemental sulfur and/or with sulfur-containing polymers comprising a polysulfide moiety in the solid composite cathodes of this invention and contribute by their electrochemical properties, their known interaction with lithium polysulfides and lithium sulfides generated during the cycling of the cells, and, optionally, their melting properties, to achieve the desired high capacities in the electric current producing cells of the present invention. Examples of these electroactive sulfur-containing materials comprising disulfide groups include those described in U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

Other suitable examples of electroactive sulfur-containing materials include materials of general formula, $C_vS$, wherein v is a numerical value within the range of about 4 to about 50, as described in U.S. Pat. No. 4,143,214 to Chang et al. Other examples of electroactive sulfur-containing polymers are those which contain one or more polymer compounds having a plurality of carbon monosulfide units that may generally be written as $(CS)_w$, wherein w is an integer of at least 5, as described in U.S. Pat. No. 4,152,491 to Chang et al.

Electroactive sulfur-containing polymers for the solid composite cathodes of the present invention typically have elemental compositions containing between about 50 weight percent and 98 weight percent sulfur. In one embodiment, the sulfur-containing polymer comprises greater than 75 weight percent of sulfur, and, preferably, greater than 86 weight per cent of sulfur, and, most preferably, greater than 90 weight percent of sulfur.

Solid Composite Cathodes

One aspect of the present invention pertains to a solid composite cathode for use in an electric current producing cell, wherein a cathode active layer of the solid composite cathode comprises an electroactive sulfur-containing material and an electrically conductive material, wherein said electroactive sulfur-containing material is melted by heating to a temperature above its melting point to form a melt layer and then resolidified to form a cathode active layer having redistributed electroactive sulfur-containing material, and wherein said redistributed electroactive sulfur-containing material is present in said cathode active layer at a volumetric density of greater than 500 mg/cm$^3$. The amount of the electroactive sulfur-containing material that melts and then resolidifies to form a redistributed sulfur-containing material may vary widely from a small portion of only a few percent by weight of the total weight of the electroactive sulfur-containing material up to the entire amount of the electroactive sulfur-containing material, as long as the desired effect of improved cohesive binding in the cathode active layer and of improved adhesion to any adjacent layers is achieved together with no significant reduction in the electrochemical utilization when the solid composite cathode is incorporated into an electric current producing cell. Since there may be a blend of electroactive sulfuir-containing materials in the cathode active layer, such as, for example, a blend of elemental sulfur, sulfur-containing polymer with covalent polysulfide moieties, sulfuir-containing polymer with ionic polysulfide moieties, and sulfur-containing polymer with disulfide moieties, one or more of these different electroactive sulfuir-containing materials may be partially or completely melted and resolidified to form the redistributed electroactive sulfur-containing materials in the solid composite cathodes of the present invention.

The solid composite cathodes of this invention are particularly advantageous to provide mechanical strength, adhesive properties, and densification to the cathode active layer when there is no polymeric binder, or alternatively, almost no polymeric binder, present in the cathode active layer. This is highly desirable when trying to maximize the volumetric density of the electroactive sulfuir-containing material by lowering the amount of non-electroactive materials in the cathode active layer, especially those materials with low specific densities which thus occupy an increased volume percentage of the cathode active layer, and to further maximize the electrochemical utilization by reducing the interference by the polymeric binder to ionic electrolyte interactions and to electrochemical cycling when the solid composite cathode is incorporated into electric current producing cells. The solid composite cathodes of the present invention are similarly advantageous to provide mechanical strength, adhesive properties, and densification to the cathode active layer when there is no ionically conductive material, or, alternatively, almost no ionically conductive material, present in the cathode active layer. Many of the ionically conductive materials have binder or film-forming properties similar to those of the polymeric binders and thus typically also contribute to the mechanical strength and the cohesive and adhesive properties of the cathode active layer.

Elemental sulfur has a melting point of about 116° C. Many of the electroactive sulfur-containing polymers with polysulfide moieties have melting points in the range of 95° C. to 118° C. The temperature to which the electroactive sulfur-containing material in the cathode active layer is heated should be greater than its melting point, but does not need to be significantly higher than its melting point. Other considerations in selecting the temperature at which to melt the electroactive sulfur-containing material are the dimensional stability to temperature of other components present, such as, for example, plastic film-based substrates, and the speed or rate of melting desired. In one embodiment of the solid composite cathodes of the present invention, the temperature to which said electroactive sulfur-containing material is heated for melting is greater than 120° C. In one embodiment, the temperature to which said electroactive sulfur-containing material is heated for melting is greater than 140° C. In one embodiment, the temperature to which said electroactive sulfur-containing material is heated for melting is greater than 160° C. Higher temperatures for melting the electroactive sulfur-containing material may have particular advantages in forming both a redistributed as well as a different physical or chemical form of the electroactive sulfur-containing material upon resolidifying. For example, elemental sulfur is known to form polymeric sulfur upon melting and heating above 159° C. and then resolidifying. The formation of polymeric sulfur may provide even further improved mechanical integrity, cohesion, and adhesion to the solid composite cathodes while also improving the densification of the cathode active layer and enhancing the electrochemical utilization in cells.

The term "cathode active layer," as used herein, pertains to any layer of the solid composite cathode that comprises the cathode active material. The relative amounts of sulfur-containing material, electrically conductive material, and optional non-electroactive components such as polymeric binders, ionically conductive materials, non-electroactive electroactive metal oxides, and other additives in the cathode active layer may vary widely. Generally these relative amounts are determined by experimentation and are chosen so as to maximize the amount of electroactive sulfur-containing material present while also optimizing the manufacturing efficiency of fabrication into an electric current producing cell and the resultant electrochemical performance, including capacity, of the electric current producing cell. The melting and resolidification to form a cathode active layer having redistributed electroactive sulfur-containing material of the solid composite cathodes of this invention is very advantageous in allowing the cathode active layer to comprise a very high weight per cent of said electroactive sulfur-containing material while still providing the mechanical strength and the cohesive and adhesive properties normally provided by significant amounts of non-electroactive components. By removing these non-electroactive components from the cathode active layer composition, a proportionately higher amount of electroactive sulfur-containing material may be incorporated, especially since reduced amounts of non-electroactive components such as binders also typically lower the amount of the electrically conductive material also needed in the cathode active layer. In one embodiment of the solid composite cathodes of this invention, said redistributed electroactive sulfur-containing material is present in an amount of 60 to 95% by weight of said cathode active layer. In one embodiment, said redistributed electroactive sulfur-containing material is present in an amount of 65 to 90% by weight of said cathode active layer. In one embodiment, said redistributed electroactive sulfur-containing material is present in an amount of 70 to 85% by weight of said cathode active layer.

The term "volumetric density," as used herein, pertains to the amount of the electroactive sulfur-containing material in a volume of the cathode active layer and is typically expressed in mg of electroactive sulfur-containing material per cm$^3$ of cathode active layer. The volumetric density may be calculated from the weight of the cathode active layer per surface area, typically expressed in mg of the cathode active layer per cm$^2$ of the cathode active layer surface, multiplied by the weight percent of the electroactive sulfur-containing material based on the total weight of the cathode active layer, and then dividing this product by the thickness of the cathode active layer, typically expressed in cm. For example, in Example 1 of U.S. Pat. No. 5,523,179 to Chu, the weight of the cathode active layer per surface area of the cathode active layer was approximately 0.0028 g/cm$^2$, or 2.8 mg/cm$^2$. Multiplying this value by the 50 weight percent of elemental sulfur in the composition provides a value of 1.4 mg of elemental sulfur/cm$^2$ of the cathode active layer. No value is reported in Example 1 of the 179 patent for the thickness of the cathode active layer. For purposes of illustrating the calculation of volumetric density, if the thickness of the cathode active layer in Example 1 of the 179 patent were 50 microns, or 0.0050 cm, then the volumetric density would be 1.4 mg/cm$^2$ divided by 0.0050 cm, or 280 mg/cm$^3$. Similarly, if the thickness of the cathode active layer in Example 1 of the 179 patent were 20 microns, or 0.0020 cm, then the volumetric density would be 1.4 mg/cm$^2$ divided by 0.0020 cm, or 700 mg/cm$^3$.

The volumetric density of the electroactive sulfur-containing material in the cathode active layer in the solid composite cathodes of the present invention may be calculated from the weight of the cathode active layer per surface area, the weight percent of the electroactive sulfur-containing material in the composition of the cathode active layer, and the thickness of the cathode active layer. The electroactive sulfur-containing material comprises the redistributed electroactive sulfur-containing material formed from the melting and subsequent resolidification of the electroactive sulfur-containing material in the cathode active layer. In one embodiment of the solid composite cathodes of the present invention, said redistributed electroactive sulfur-containing material is present in said cathode active layer at a volumetric density greater than 700 mg/cm$^3$, preferably, greater than 1000 mg/cm$^3$, more preferably, greater than 1300 mg/cm$^3$, and most preferably, greater than 1500 mg/cm$^3$.

Useful electrically conductive materials in the solid composite cathodes of the present invention are those known to one skilled in the art of electrode fabrication and are such that they provide electrical connectivity to the majority of the electroactive materials in the solid composite cathode. Examples of useful electrically conductive additives include, but are not limited to, conductive carbons, conductive graphites, active carbon fibers, metal flakes, metal powders, metal fibers, electrically conductive polymers, and electrically conductive metal chalcogenides. Other useful electrically conductive materials include carbon nanofibers, as described in U.S. patent application Ser. No.08/995,090, to Geronov et al. of the common assignee.

In one embodiment of the solid composite cathodes of the present invention, the cathode active layer further comprises a polymeric binder. The choice of polymeric binder may vary greatly so long as it is inert with respect to the other materials in the cathode active layer. Useful polymeric binders are those materials that allow for ease of processing of battery electrode composites and are generally known to those skilled in the art of electrode fabrication. Examples of useful binders include, but are not limited to, polymers such as polytetrafluoroethylenes, polyvinylidene fluorides, ethylene-propylene-diene (EPDM) rubbers, polyethylene oxides, UV curable acrylates, UV curable methacrylates, and heat curable divinyl ethers. Examples of other useful binders are cationic polymers with quaternary ammonium salt groups, as described in U.S. patent application Ser. No. 08/994,343, to Zhang et al. of the common assignee. As discussed herein, it is desirable to keep the amount of polymeric binder as low as possible in order to maximize the amount of electroactive sulfur-containing material in the cathode active layer and also to minimize the negative interferences of polymeric binder on the electrochemical utilization of the sulfur-containing materials in cathode active layers of high volumetric density, such as greater than 500 mg/cm$^3$, when incorporated into cells. In one embodiment of the solid composite cathodes of the present invention, the polymeric binder is present in an amount less than 10% by weight of said cathode active layer. In one embodiment, the polymeric binder is present in an amount less than 6% by weight of said cathode active layer. In one embodiment, the polymeric binder is present in an amount less than 3% by weight of said cathode active layer.

In one embodiment of the solid composite cathodes of the present invention, the cathode active layer further comprises an ionically conductive material. Useful ionically conductive materials include, but are not limited to, liquid, solid, or gel materials capable of storing and transporting ions, so long as the ionically conductive material is stable electrochemically and chemically with respect to the other materials in the cathode active layer, and the ionically conductive material facilitates the transport of ions. Examples of useful ionically conductive materials include, but are not limited to, polyethylene oxides, polypropylene oxides, polyphosphazenes, polyacrylonitriles, and polysiloxanes; to which is added an appropriate ionic electrolyte salt. Since nearly all ionically conductive materials also have the general film-forming properties of polymeric binders as well as being non-electroactive, a similar desirability to minimize the amount of ionically conductive material in the cathode active layer exists as described herein for polymeric binders. In one embodiment, the ionically conductive material in the solid composite cathodes of the present invention is present in an amount less than 10% by weight of said cathode active layer. In one embodiment, the ionically conductive material is present in an amount less than 6% by weight of said cathode active layer. In one embodiment, the ionically conductive material is present in an amount less than 3% by weight of said cathode active layer.

The solid composite cathodes of the present invention also typically further comprise current collectors in contact with the cathode active layer. Suitable current collectors for use in this invention are those known to those skilled in the art of electrode fabrication for solid electroactive sulfur-containing cathode active layers. Examples of suitable current collectors include, but are not limited to, metal films, foils, nets, and expanded metal grids made from metals such as nickel, titanium, aluminum, tin, and stainless steel; and plastic films with conductive layers comprising metals such as aluminum, stainless steel, nickel, titanium, and tin. Such metallic current collectors may optionally have a layer comprising conductive carbon or graphite coated on the metallic layer, as, for example, described in U.S. Pat. No. 5,478,676, to Turi et al. The solid composite cathodes of the present invention are particularly advantageous for use with non-porous current collectors, such as those with a non-porous metallic, conductive carbon, or conductive graphite layer, where adhesion to the non-porous, relatively smooth current collector is typically difficult to achieve with high volumetric densities of electroactive sulfur-containing materials and low amounts of polymeric binder.

Methods of Making Solid Composite Cathodes

One aspect of the present invention pertains to methods for fabricating solid composite cathodes, as described herein.

One method employs a physical mixture of an electroactive sulfur-containing material, an electrically conducting material, and optionally polymeric binders, ionically conductive materials, non-electroactive metal oxides, and other additives as a slurry in a solvent or mixture of solvents, in water, or in blends of solvent and water. The mixture is fabricated into a solid cathode active layer of the desired dimensions, for example, by doctor blade coating, roll coating, dip coating, slot extrusion coating, and other means known in the art.

Mixing of the various components in the slurry may be accomplished using any of a variety of methods so long as the desired dissolution or dispersion of the components and the desired particle distribution of the pigment components is obtained. Suitable methods for mixing include, but are not limited to, mechanical agitation, grinding, ultrasonication, ball milling, sand milling, and impingement milling.

The formulated slurry dispersions may be applied to supports or current collectors by any of a variety of well-known coating methods to form a cast layer and then dried using conventional techniques to form a dried layer. Suitable manual coating techniques include, but are not limited to, the use of a coating rod or a gap coating bar. Suitable machine coating methods include, but are not limited to, the use of rod coating, roll coating, gravure coating, curtain coating, bead coating, and slot extrusion coating. Removal of some or all of the liquid from the mixture may be accomplished by any of a variety of conventional means. Examples of suitable methods for the removal of liquid from the mixture include, but are not limited to, hot air convection, heat, infrared radiation, flowing gases, vacuum, reduced pressure, extraction, and by simply drying by evaporation under ambient conditions if convenient.

Heating of the cathode active layer to a temperature above the melting point of the electroactive sulfur-containing material in order to melt the electroactive sulfur-containing material to form a melt layer may be accomplished during the drying step that removes the liquids to form the solid cathode active layer, or it may be accomplished in a post-heating step after the drying step to remove the liquids. Examples of suitable methods for use in a post-heating step to melt the electroactive sulfur-containing material include, but are not limited to, hot air convection, heat, and infrared radiation. The melting point of the electroactive sulfur-containing material may be determined by conventional techniques, such as, for example, by measuring the melting point of a sample of either the electroactive sulfur-containing material by itself or the cathode active layer (since it typically comprises a very high weight percent of the electroactive sulfur-containing material) by utilizing a conventional melting point apparatus or by utilizing a conventional differential scanning calorimeter. In addition to utilizing a temperature and time of heating which is sufficient to melt the electroactive sulfur-containing material in the cathode active layer, an increase in the adhesion of the cathode active layer to the substrate, an increase in the cohesive strength of the cathode active layer, and an increase in the volumetric density of the electroactive sulfur-containing material due to a decrease in the thickness of the cathode active layer are indications that melting of the electroactive sulfur-containing material in the methods of the present invention has occurred.

The substrate surface underneath the cathode active layer typically is a metal layer or a conductive pigment coating layer which is acting as a current collector. Sufficient adhesion for mechanical integrity during fabrication into cells and during operation of the cells of the cathode active layer to this type of surface is difficult to achieve when high amounts of electroactive sulfur-containing material and electrically conductive material are present and either a very low amount or no polymeric binder or ionically conductive material is present. The melting and subsequent resolidification of the electroactive sulfur-containing material significantly improves this adhesion.

Also, the melting and subsequent resolidification of the electroactive sulfur-containing material typically results in a 10 to 20% reduction in the thickness of the cathode active layer, which corresponds to about a 11 to 25% increase in volumetric density of the redistributed electroactive sulfur-containing material. The term "redistributed," as used herein, pertains to the physical distribution of the electroactive sulfuir-containing material in the cathode active layer and includes all the electroactive sulfur-containing material that was present in the solid cathode active layer before the heating to a temperature above the melting point of the electroactive sulfuir-containing material and that further has, after the heating to melt the electroactive sulfur-containing material and the subsequent resolidification upon cooling, changed its three-dimensional physical location in the cathode active layer. The action of melting and subsequently resolidifying the electroactive sulfur-containing material and the accompanying change in the thickness of the cathode active layer are consistent with the formation of the redistributed electroactive sulfur-containing material in the cathode active layer.

One aspect of the present invention pertains to methods of forming a solid composite cathode for use in an electric current producing cell, wherein the method comprises the steps of: (a) dispersing or suspending an electroactive sulfur-containing material and an electrically conductive material in a liquid medium to form a liquid mixture; (b) casting said liquid mixture formed in step (a) onto a substrate to form a cast layer; (c) removing some or all of said liquid medium from said cast layer formed in step (b) to form a dried layer on said substrate; (d) melting said electroactive sulfur-containing material in said dried layer by heating to a temperature above the melting point of said electroactive sulfur-containing material to form a melt layer; and, (e) resolidifying said melted electroactive sulfur-containing material formed in step (d) to form a cathode active layer having redistributed electroactive sulfur-containing material, wherein said redistributed electroactive sulfur-containing material is present at a volumetric density of greater than 500 mg/cm$^3$. In one embodiment of the methods of forming a solid composite cathode of this invention, said liquid mixture formed in step (a) and said cathode active layer formed in step (e) do not comprise a polymeric binder. In another embodiment of the methods of forming a solid composite cathode of the present invention, said liquid mixture formed in step (a) and said cathode active layer formed in step (e) do not comprise an ionically conductive material.

Once formed, the solid cathode active layer may optionally be calendered using conventional calendering techniques to provide a solid cathode active layer with a desired thickness, porosity, and volumetric density of electroactive sulfur-containing material. The calendering step may be applied once or multiple times at a single step or at multiple steps of making the solid composite cathodes. In one embodiment of the methods of forming solid composite cathodes of this invention, the cathode active layer is compressed by calendering prior to melting the electroactive sulfur-containing material by heating to a temperature above its melting point. In one embodiment, the cathode active layer is compressed by calendering after melting the electroactive sulfur-containing material by heating to a temperature above its melting point, but prior to resolidifying the melted electroactive sulfur-containing material. This may be done by calendering immediately following the melting step before the cathode active layer has cooled sufficiently to resolidify or, alternatively, this may be done by calendering with a delay after the melting step if the electroactive sulfur-containing material has a slow resolidification process after melting, such as, for example, may occur with elemental sulfur when melted and heated above 160° C. and not fully resolidifying for several days after returning to ambient conditions. In another embodiment, the cathode active layer is compressed after resolidification of the melted electroactive sulfur-containing material to form said redistributed electroactive sulfur-containing material. The compressing may be done by a combination of these compressing steps before and after melting and resolidification of the electroactive sulfur-containing material.

The primary benefit of the calendering or other type of compressing step or steps is a significant reduction of the thickness of the cathode active layer, such as, for example, by 20 to 60%. This provides a corresponding increase in the volumetric density of the electroactive sulfur-containing material. In combination with improved adhesion, improved cohesion, coating densification, and high volumetric density/very low binder formulation capability provided by the melting and resolidification of the electroactive sulfur-containing material of the solid composite cathodes of this invention, the increased coating densification and volumetric density provided by the calendering or other type of compressing further enhances the volumetric capacity of the cathode active layer when incorporated into electric current producing cells. Typically, without this melting and resolidification process, calendering of the cathode active layer comprising electroactive sulfur-containing material, particularly when more than 3% by weight of a polymeric binder is present and, more particularly, when more than 6% of a polymeric binder is present, significantly lowers the specific capacity of the electroactive sulfur-containing material when incorporated into cells such that the volumetric capacity is less than for the corresponding cathode active layer without any calendering.

Examples of liquid media for use in the methods of forming the solid composite cathodes of the present invention include, but are not limited to, aqueous liquids, non-aqueous liquids, and mixtures thereof Examples of non-aqueous liquids include, but are not limited to, methanol, ethanol, isopropanol, 1-propanol, butanol, tetrahydrofuran, dimethoxyethane, acetone, toluene, xylene, acetonitrile, heptane, and cyclohexane.

Optionally, polymeric binders, ionically conductive materials, non-electroactive metal oxides, such as, for example, silicas, aluminas, and boehmites, and other non-electroactive additives in the composition of the cathode active layer may be added to the mixture prior to casting the mixture onto the substrate.

Rechargeable Battery Cells and Methods of Making Same

One aspect of the present invention pertains to an electric current producing cell which comprises:
(a) an anode;
(b) a solid composite cathode, wherein said cathode is formed by the methods of the present invention, as described herein; and,
(c) an electrolyte interposed between said anode and said cathode.

In one embodiment of the cells of the present invention, said cathode active layer, upon discharge, has a volumetric capacity greater than 500 mAh/cm$^3$. In one embodiment, said cathode active layer, upon discharge, has a volumetric capacity greater than 600 mAh/cm$^3$. In a preferred embodiment, said cathode active layer, upon discharge, has a volumetric capacity greater than 700 mAh/cm$^3$, and, more preferably, greater than 900 mAh/cm$^3$, and, most preferably, greater than 1100 mAh/cm$^3$. The term "volumetric capacity," as used herein, pertains to the capacity of the electric current producing cell upon complete discharge from a charged state for a total volume of the cathode active layer in the electric current producing cell and is typically expressed in mAh of capacity per cm$^3$ of the cathode active layer present in the cell. The volumetric capacity may be calculated from the volumetric density of the cathode active layer, expressed in grams (g) per cm$^3$, multiplied by the specific capacity of the electroactive material in the cell, where the specific capacity is typically expressed in mAh of capacity per g of electroactive sulfur-containing material in the cell. For example, in the aforementioned Example 1 of U.S. Pat. No. 5,523,179 to Chu and using a hypothetical thickness of the cathode active layer of 50 microns, or 0.0050 cm, if the volumetric density were 280 mg/cm$^3$, or 0.28 g/cm$^3$, multiplying this volumetric density by the reported specific capacity of 330 mAh/g for the elemental sulfuir in the cathode active layer gives a volumetric capacity of 92.4 mAh/cm$^3$. Similarly, using a hypothetical thickness of the cathode active layer in Example 1 of the'179 patent of 20 microns, or 0.0020 cm, if the volumetric density were then 700 mg/cm$^3$, or 0.7 g/cm$^3$, multiplying this volumetric density by the reported specific capacity of 330 mAh/g for the elemental sulfuir in the cathode active layer gives a volumetric capacity of 231 mAh/cm$^3$. Also, the volumetric capacity may be calculated by other methods, such as, by the simpler method of dividing the measured capacity of the cell in mAh by the total volume of the electroactive sulfur-containing material in the cell. It can be seen from these sample calculations that a combination of high volumetric density in the cathode active layer and of high specific capacity for the electroactive sulfur-containing material in the cell are necessary to achieve high volumetric capacities, such as, for example, greater than 500 mAh/cm$^3$. The cells of the present invention are highly advantageous in providing this desired combination of high volumetric capacity and high specific capacity for the electroactive sulfuir-containing material.

Another aspect of the present invention pertains to a method of forming an electric current producing cell, which method comprises the steps of:
(a) providing an anode;
(b) providing a solid composite cathode formed by the methods of this invention, as described herein; and,
(c) enclosing an electrolyte between said anode and said cathode.

In one embodiment, the electric current producing cell is a secondary (rechargeable) electric current producing cell.

The anode active material of the anode may be comprised of one or more metals or metal alloys or a mixture of one or more metals and one or more alloys, wherein said metals are selected from the Group IA and IIA metals in the Periodic Table. Suitable anode active materials include, but are not limited to, alkali-metal intercalated conductive polymers, such as lithium doped polyacetylenes, lithium doped polyphenylenes, lithium doped polypyrroles, and the like, and alkali-metal intercalated graphites and carbons. Anode active materials comprising lithium are particularly useful for the anode of the cells of the present invention. Preferred anode active materials are lithium metal, lithium-aluminum alloys, lithium-tin alloys, lithium-intercalated carbons, and lithium-intercalated graphites.

The electrolytes used in battery cells function as a medium for the storage and transport of ions, and in the special case of solid electrolytes and gel electrolytes, these materials may additionally function as separator materials between the anode and the cathode. Any liquid, solid, or gel material capable of storing and transporting ions may be used, so long as the material is electrochemically and chemically unreactive with respect to the anode and the cathode, and the material facilitates the transport of ions between the anode and the cathode. The electrolyte must also be electronically non-conductive to prevent short circuiting between the anode and the cathode.

Examples of suitable electrolytes for use in the present invention include, but are not limited to, organic electrolytes comprising one or more materials selected from the group consisting of: liquid electrolytes, gel polymer electrolytes, and solid polymer electrolytes.

Examples of useful liquid electrolytes include, but are not limited to, liquid electrolyte solvents, such as, for example, N-methyl acetamide, acetonitrile, carbonates, sulfones, sulfolanes, aliphatic ethers, cyclic ethers, glymes, siloxanes, dioxolanes, aliphatic ethers, cyclic ethers, N-alkylpyrrolidones, substituted forms of the foregoing, and blends thereof, to which is added an appropriate ionic electrolyte salt.

These liquid electrolyte solvents are themselves useful as plasticizers for gel polymer electrolytes. Examples of useful gel polymer electrolytes include, but are not limited to, those comprising polymers selected from the group consisting of: polyethylene oxides, polypropylene oxides, polyacrylonitriles, polysiloxanes, polyimides, polyphosphazenes, polyethers, sulfonated polyimides, perfluorinated membranes (NAFION™ resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing; to which is added an appropriate ionic electrolyte salt.

Examples of useful solid polymer electrolytes include, but are not limited to, those comprising polymers selected from the group consisting of: polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing; to which is added an appropriate ionic electrolyte salt.

In addition to solvents, gelling agents, and ionically conductive polymers as known in the art for non-aqueous electrolytes, the non-aqueous electrolyte further comprises one or more ionic electrolyte salts, also as known in the art, to increase the ionic conductivity.

Examples of ionic electrolyte salts for use in the present invention include, but are not limited to, MSCN, MBr, MI, $MIO_4$, $MAsF_6$, $MSO_3CF_3$, $MSO_3CH_3$, $MBF_4$, $MB(Ph)_4$, $MPF_6$,

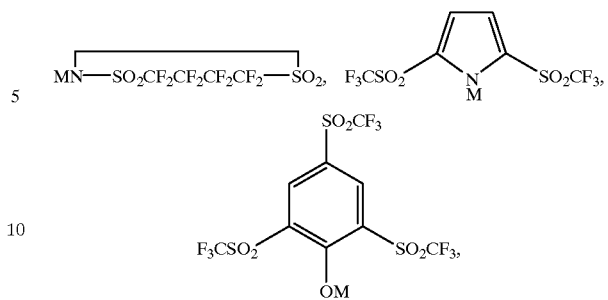

and the like, where M is Li or Na. Other electrolyte salts useful in the practice of this invention are lithium polysulfides, lithium salts of organic ionic polysulfides, and those disclosed in U.S. Pat. No. 5,538,812 to Lee et al. Preferred ionic electrolyte salts are LiI, LiSCN, $LiSO_3CF_3$ (lithium triflate), $LiN(SO_2CF_3)_2$ (lithium imide), and LiSCN.

EXAMPLES

Several embodiments of the present invention are described in the following examples, which are offered by way of illustration and not by way of limitation.

Example 1

A cathode active layer with a composition by weight of 85% elemental sulfur (Aldrich Chemical Co., Milwaukee, Wis.) and 15% conductive carbon pigment (PRINTEX XE-2, a trademark for carbon pigments available from Degussa Corporation, Akron, Ohio) was prepared by the following method. A liquid mixture or slurry of the elemental sulfur and carbon pigment with isopropanol as the solvent was prepared in a small ball mill jar by adding the solvent and then adding the solid ingredients. The solids content of the slurry was 12 weight percent. The slurry mixture was ball milled for 20 hours in a ball mill jar containing ceramic cylinders. The resulting mixture was cast by hand draw with a gap coating bar onto one side of a 18 micron thick conductive carbon coated aluminum foil (Product No. 60303 available from Rexam Graphics, South Hadley, Mass.) as a current collector and substrate. The coating was dried under ambient conditions overnight and dried under vacuum at 60° C. for one hour. The resulting dry cathode active layer had a thickness of about 20 microns with a loading of the electroactive sulfur-containing material (elemental sulfur) of 1.23 mg/cm². The volumetric density of the electroactive sulfur-containing material is the product of the loading (1.23 mg/cm²) divided by the coating thickness of 20 microns, or 0.0020 cm, which gives a volumetric density of about 615 mg/cm³. Heat treatment of this dry cathode active layer at 150° C. for about 45 seconds followed by cooling at ambient conditions for 24 hours gave a 20% reduction in coating thickness, an increase in volumetric density to about 769 mg/cm³, and a significant improvement in the cohesion of the cathode active layer compared to the non-heat treated cathode active layer, as determined by the "crinkle" test of flexing the solid composite cathode to develop creases in the substrate and observing the amount of cathode active layer that flakes off of the substrate and by the amount of cohesive failure of the cathode active layer. When the cathode with the heat-treated cathode active layer was subsequently calendered through a single-nip laboratory calender with stainless steel rolls on both sides, this further decreased the coating thickness by 35% and increased the volumetric density to about 1190 mg/cm³. When the order of the heat treatment/cooling and calendering steps were reversed, the cathode active layer after calendering only was decreased by 47% compared to the non-heated initial cathode active layer, and the volumetric density was increased to about 1170 mg/cm³. However, no significant improvement in cohesion was found in the calendered sample compared to the non-heat treated sample. Subsequent heat treatment of the cathode active layer after calendering by heating to 150° C. for 45 seconds and then cooling at ambient conditions for 24 hours further decreased the coating thickness by 22% compared to the calendered-only cathode active layer, increased the volumetric density to about 1500 mg/cm³, and significantly improved the cohesion and adhesion of the cathode active layer.

Example 2

The solid composite cathodes from Example 1 were utilized to form electric current producing cells in a vial cell format of about 80 cm² in area. The anode was lithium foil of about 50 microns in thickness. The electrolyte was a 0.75 M solution of lithium imide (available from 3M Corporation, St. Paul, Minn.) in a 50:50 by volume mixture of 1,3-dioxolane and dimethoxyethane (DME). The porous separator used was E25 SETELA, a trademark for a polyolefin separator available from Tonen Chemical Corporation, Tokyo, Japan, and also available from Mobil Chemical Company, Films Division, Pittsford, N.Y. These components were combined into a layered structure of solid composite cathode/separator/anode with the liquid electrolyte filling the void areas of the separator and solid composite cathode to form vial cells of about 80 cm² in area. Discharge-charge cycling on these cells was done at 24 mA or 0.3 mA/cm² with discharge cutoff at a voltage of 1.3 V and charge cutoff at 120% overcharge of the previous discharge capacity or 2.8 V, whichever came first. The solid composite cathodes from Example 1 where the cathode active layer had no heat treatment and no calendering had poor adhesion and cohesion of the cathode active layer and could not be fabricated into vial cells due to the fragility of the cathode active layer. The volumetric densities of the cathode active layers with the different heat treatment and calendering processes used, the specific capacities of the electroactive sulfur-containing material in the different vial cells at the 5th discharge cycle, and the volumetric capacities of the electroactive sulfur-containing material in the different vial cells at the 5th discharge cycle are shown below:

| Processing of Cathode Active Layer | Volumetric Density (mg/cm³) | Specific Capacity (mAh/g, 5th cycle) | Volumetric Capacity (mAh/cm³, 5th cycle) |
|---|---|---|---|
| Heat Treatment Only | 769 | 569 | 433 |
| Heat Treatment and Then Calender | 1190 | 420 | 500 |
| Calender | 1170 | 500 | 585 |
| Calender and Then Heat Treatment | 1500 | 208 | 312 |

Heat treatment of the cathode active layers was advantageous in increasing the volumetric density compared to cathode active layers without heat treatment as well as the significant improvement in adhesion and cohesion of the cathode active layer that resulted from the heat treatment/resolidification process.

Example 3

Solid composite cathodes were prepared as described in Example 1, except that the 85% by weight of elemental sulfur was changed to 75% by weight and 10% by weight of polyethylene oxide binder (5,000,000 molecular weight grade available from Polysciences, Inc., Warrington, Pa.) was substituted into the composition of the cathode active layer. Besides being a polymeric binder, the polyethylene oxide has the properties of an ionically conductive material in the presence of ionic salts, such as lithium salts. The resulting dry cathode active layer with 10% by weight of polymeric binder present had a thickness of about 18 microns with a loading of the electroactive sulfuir-containing material (elemental sulfur) of 1.18 mg/cm². The volumetric density of the electroactive sulfuir-containing material is the product of the loading (1.18mg/cm²) divided by the coating thickness of 18 microns, or 0.0018 cm, which gives a volumetric density of about 656 mg/cm³. Heat treatment of this dry cathode active layer at 150° C. for about 45 seconds followed by cooling at ambient conditions for 24 hours gave a 14% reduction in coating thickness, an increase in volumetric density to about 755 mg/cm³, and a significant improvement in the adhesion and cohesion of the cathode active layer compared to the non-heat treated cathode active layer, as determined by the "crinkle" test. When the cathode with the heat-treated cathode active layer was subsequently calendered through the single-nip calender, as described in Example 1, this decreased the coating thickness by 8% and increased the volumetric density to about 816 mg/cm³.

Example 4

The solid composite cathodes from Example 3 were utilized to form electric current producing cells in a vial cell format of about 80 cm² in area, as described in Example 2. As described also in Example 2, the solid composite cathodes from Example 3 where the cathode active layer had no heat treatment and no calendering had poor adhesion and cohesion and could not be fabricated into the vial cells due to the fragility of the cathode active layer. Discharge-charge cycling was done as described in Example 2 and provided the following results:

| Processing of Cathode Active Layer | Volumetric Density (mg/cm³) | Specific Capacity (mAh/g, 5th cycle) | Volumetric Capacity (mAh/cm³, 5th cycle) |
|---|---|---|---|
| Heat Treatment Only | 755 | 555 | 420 |
| Heat Treatment and Then Calender | 816 | 480 | 400 |

Heat treatment of the cathode active layers was advantageous in increasing the volumetric density compared to cathode active layers without heat treatment, as well as the significant improvement in adhesion and cohesion of the cathode active layer that resulted from the heat treatment/resolidification process.

Example 5

A cathode active layer with a composition by weight of 75% elemental sulfur, 12% conductive carbon pigment (PRINTEX XE-2), and 10% aluminum boehmite sol DISPAL 1 IN7–12 (a trademark for boehmite sol available from CONDEA Vista Company, Houston, Tex.) was prepared by the following method. A liquid mixture or slurry of the elemental sulfur, carbon pigment, and boehmite sol with isopropanol as the solvent was prepared in a small jar by adding the solvent, adding the solid ingredients, and then dispersing with mechanical agitation with a high speed mixer. The solids content of the slurry was 12 weight percent. The slurry mixture was milled through a 250 ml Eiger sand mill. The resulting mixture was cast by hand draw with a gap coating bar onto both sides of a 18 micron thick conductive carbon coated aluminum foil (Product No. 60303) as a current collector. The coating was dried under ambient conditions overnight, and then under vacuum at 60° C. for one hour. Based on the average of three samples, the resulting dry cathode active layer had a thickness of about 19 microns with a volumetric density of the electroactive sulfur-containing material of about 745 mg/cm$^3$. Based on the average of three samples, heat treatment of this dry cathode active layer at 150° C. for about 45 seconds following by cooling at ambient conditions for 24 hours gave a 8% reduction in coating thickness, an increase in volumetric density to about 810 mg/cm$^3$, and a significant improvement in the adhesion and cohesion of the cathode active layer compared to the non-heat treated cathode active layer, as determined by the "crinkle" test. Based on the average of three samples, when the cathode with the non-heat treated cathode active layer was subsequently calendered through the single-nip calender, as described in Example 1, this further decreased the coating thickness by 20% and increased the volumetric density to about 934 mg/cm$^3$. However, no significant improvement in cohesion was found in the calendered sample compared to the non-heat treated sample.

Example 6

The solid composite cathodes from Example 5 were utilized to form electric current producing cells in a AA cell format. AA cells were assembled by combining a 50 micron lithium foil, a 25 micron thick E25 SETELA separator, and the solid composite cathode into a roll and inserting this roll into a AA cell casing followed by filling with an electrolyte solution of 0.75 M lithium imide in a 50:50 by volume mixture of 1,3-dioxolane and 1,2-dimethoxyethane. Discharge-charge cycling on these cells was done at 0.3 mA/cm$^2$ with discharge cutoff at a voltage of 1.3 V and charge cutoff at 120% overcharge of the previous discharge capacity or 2.8 V, whichever came first. The following results based on capacity at the 10th discharge cycle were found:

| Processing of Cathode Active Layer | Volumetric Density (mg/cm$^3$) | Specific Capacity (mAh/g, 5th cycle) | Volumetric Capacity (mAh/cm$^3$, 5th cycle) |
| --- | --- | --- | --- |
| No Heat Treatment and No Calender | 745 | 475 | 354 |
| Heat Treatment Only | 810 | 626 | 507 |
| Calender Only | 934 | 314 | 293 |

Heat treatment only of the cathode active layers was advantageous in increasing the volumetric density and the volumetric capacity compared to cathode active layers without heat treatment as well as the significant improvement in adhesion and cohesion of the cathode active layer that resulted from the heat treatment/resolidification process. Calendering only of the cathode active layers significantly increased the volumetric density of the cathode active layer, but showed a significant decrease in specific capacity and volumetric capacity compared to heat treatment only of the cathode active layers.

Example 7

Solid composite cathodes were prepared as described in Example 5, except that 3% by weight of pre-washed PYROGRAF-III carbon nanofibers (having a nominal diameter of 200 nm), a trade name for carbon filaments available from Applied Sciences, Inc., Cedarville, Ohio, and washed as described in the aforementioned U.S. patent application Ser. No.08/995,090 to Geronov et al., were substituted for 3% by weight of the PRINTEX XE-2 conductive carbon pigment in the composition. Based on the average of three samples, the resulting dry cathode active layer has. a thickness of about 25 microns with a volumetric density of the electroactive sulfur-containing material of about 561 mg/cm$^3$. The lower volumetric density in Example 7 compared to Example 5 is consistent with the more open and porous cathode active layer expected with the incorporation of the carbon nanofibers. Based on the average of three samples, heat treatment of this dry cathode active layer at 150° C. for about 45 seconds followed by cooling at ambient conditions for 24 hours gave an 8% reduction in coating thickness, an increase in volumetric density to about 611 mg/cm$^3$, and a significant improvement in the adhesion and cohesion of the cathode active layer compared to the non-heat treated cathode active layer, as determined by the "crinkle" test. Based on the average of three samples, when the cathode with the non-heat treated cathode active layer was subsequently calendered through the single-nip calender, as described in Example 1, this decreased the coating thickness by 28% and increased the volumetric density to about 786 mg/cm$^3$. However, no significant improvement in cohesion was found in the calendered sample compared to the non-heat treated sample.

Example 8

The solid composite cathodes from Example 7 were utilized to form electric current producing cells in a AA cell format using the procedures described in Example 6. Testing was carried out using the procedures as described in Example 6. The following test results based on capacity at the 10th discharge cycle were found:

| Processing of Cathode Active Layer | Volumetric Density (mg/cm$^3$) | Specific Capacity (mAh/g, 10th cycle) | Volumetric Capacity (mAh/cm$^3$, 10th cycle) |
| --- | --- | --- | --- |
| No Heat Treatment and No Calender | 561 | 585 | 328 |
| Heat Treatment Only | 611 | 642 | 392 |
| Calender Only | 786 | 455 | 358 |

Heat treatment only of the cathode active layers was advantageous in increasing the volumetric density and the volumetric capacity compared to cathode active layers without heat treatment as well as the significant improvement in cohesion of the cathode active layer that resulted from the heat treatment/resolidifcation process. Calendering only of the cathode active layers significantly increased the volumetric density of the cathode active layer, but showed a significant decrease in specific capacity and volumetric capacity compared to heat treatment only of the cathode active layers.

Example 9

A cathode active layer with a composition by weight of 75% elemental sulfur, 20% conductive carbon pigment (PRINTEX XE-2), and 5% by weight of pre-washed PYROGRAF-III 1 carbon nanofibers was prepared by the following method. A liquid mixture or slurry of the elemental sulfur, carbon pigment, and carbon nanofibers with isopropanol as the solvent was prepared in a large pail by adding the solvent, adding the solid ingredients, and then dispersing with mechanical agitation with a high speed mixer. The solids content of the slurry was 12 weight percent. The slurry mixture was milled through a sand mill (5 liter Eiger mill). The resulting mixture was coated by slot die extrusion on a coating machine onto the metallized side of a 25 micron thick polyester film with a 700 Angstrom deposition layer of aluminum on one side and dried at 90° C. for about 3 minutes by hot air convection in the ovens of the coating machine. The resulting dry cathode active layer had a thickness of about 20 microns with a loading of the electroactive sulfur-containing material (elemental sulfur) of about 0.87 mg/cm$^2$. After heat treatment of the cathode active layer at 130° C. for about 1 minute in an oven with hot air convection heating followed by cooling at ambient conditions for 24 hours, there was a significant improvement in the adhesion and cohesion of the cathode active layer after heat treatment and subsequent cooling compared to the non-heat treated cathode active layer, as determined by the "crinkle" test. The cathode with the heat-treated cathode active layer was subjected to four different levels of calendering using a single-nip calender, as described in Example 1. This heat treatment followed by four levels of calendering resulted in four different samples with increasing levels of volumetric density and corresponding decreasing coating thicknesses ranging from about 16 microns down to about 8 microns. The adhesion and cohesion of the cathode active layer after calendering was similar to the adhesion and cohesion after heat treatment and cooling. These solid composite cathodes with four different levels of calendering were utilized to form electric current producing cells in a prismatic cell format of about 700 cm$^2$ in area. The anode was a lithium foil of about 50 microns in thickness. The electrolyte was a 0.75 M solution of lithium imide in a 50:50 by volume mixture of 1,3-dioxolane and 1,2-dimethoxyethane. The porous separator used was E25 SET-ELA polyolefin separator. These components were combined into a multi-layered structure of solid composite cathode/separator/anode with the liquid electrolyte filling the void areas of the separator and solid composite cathode to form the prismatic cells. Discharge-charge cycling on these cells was done at 0.3 mA/cm$^2$ with discharge cutoff at a voltage of 1.3 V and charge cutoff at 120% overcharge of the previous discharge capacity or 2.8 V, whichever came first. The following test results based on capacity at the 5th and the 50th discharge cycle were found:

| Processing of Cathode Active Layer | Volumetric Density (mg/cm$^3$) | Specific Capacity (mAh/g, 10th cycle) | Volumetric Capacity (mAh/cm$^3$, 10th cycle) |
|---|---|---|---|
| Heat Treatment and Light Calendering | 565 | 458 | 292 |
| Heat Treatment and Moderate Calendering | 823 | 670 | 492 |
| Heat Treatment and Heavy Calendering | 955 | 772 | 540 |
| Heat Treament and Very Heavy Calendering | 1144 | 831 | 618 |

Heat treatment followed by calendering of the cathode active layers was advantageous in increasing the volumetric density and the adhesion and cohesion compared to cathode active layers without heat treatment or calendering. The increased levels of reduction in coating thickness and increase in volumetric density of the cathode active layer, when preceded by the heat treatment, gave progressively increased volumetric capacities which were evident after 5 cycles and after 50 cycles. These improved volumetric capacities at the higher volumetric densities were also observed out to 150 cycles with these prismatic cells.

Example 10

A cathode active layer was prepared as described in Example 9, except that the mixture was coated onto one side of a 18 micron thick conductive carbon coated aluminum foil (Product No. 60303) as the current collector instead of onto an aluminized polyester film. The resulting dry cathode active layer had a loading of the electroactive sulfur-containing material (elemental sulfur) of 1.28 mg/cm$^2$. After heat treatment and a very heavy level of calendering, as described in Example 9, the volumetric density of the cathode active layer was about 1094 mg/cm$^3$ with a coating thickness of about 11.7 microns. There was a significant improvement in the adhesion and cohesion of the cathode active layer after heat treatment and subsequent cooling compared to the non-heat treated cathode active layer, as determined by the "crinkle" test. This improved cohesion was retained after the calendering step. This solid composite cathode with heat treatment followed by very heavy calendering was utilized to form electric current producing cells in a prismatic cell format of about 360 cm$^2$ in area using the components and procedure as described in Example 9, except that the electrolyte used was a solution of 1.4 M lithium imide in a 70:30 by volume mixture of 1,2-dimethoxyethane: 1,3-dioxolane. After a holding period of 24 hours from the completion of assembling the cells, discharge-charge cycling was done at 100 mA for the first cycle and then at 250 mA for discharge and 150 mA for charge for the remaining cycles. The discharge cutoff was at 1.25 V, and the charge cutoff was at 120% overcharge of the previous discharge capacity or 2.8 V, whichever came first. After the 5th discharge cycle, based on the average of two cells, the specific capacity was 787 mAh/g, and the volumetric capacity was 861 mAh/cm$^3$. After 73 cycles, based on the average of two cells, the specific capacity was 678 mAh/g, and the volumetric capacity was 742 mAh/cm$^3$. This illustrates that excellent specific and volumetric capacities may be achieved with the heat-treated and calendered solid composite cathodes of the present invention over many discharge-charge cycles of the cells.

Example 11

A cathode active layer was made as described in Example 10, except that the 5% by weight of pre-washed PYROGRAF-III carbon nanofibers was substituted by an additional 5% by weight of conductive carbon pigment (PRINTEX XE-2) in the composition. The resulting cathode active layer had a loading of the electroactive sulfur-containing material (elemental sulfur) of 1.38 mg/cm$^2$. This coating of cathode active layer was divided into two groups. The first group was heat treated at 130° C. for about 1 minute followed by cooling at ambient conditions for 24 hours. There was a significant improvement in the adhesion and cohesion of the cathode active layer after heat treatment and subsequent cooling compared to the non-heat treated cathode active layer, as determined by the "crinkle" test. The second group was not -heat treated. Both groups were then subjected to very heavy single-nip calendering, as described in Example 9. After the calendering, the first group (heat treated) had a cathode active layer with a coating thickness of 13 microns and a volumetric density of about 1059 mg/cm$^3$. After the calendering, the second group (non-heat treated) had a cathode active layer with a coating thickness of 13.5 microns and a volumetric density of about 1020 mg/cm$^3$. The cathode active layers from the two groups were assembled into prismatic cells and tested, as described in Example 10. After the 5th discharge cycle, based on the average of 3 cells, the first group (heat treated) showed a specific capacity of 785 mAh/g and a volumetric capacity of 815 mAh/cm$^3$, compared to a specific capacity of only 724 mhAh/g and a volumetric capacity of only 739 mAh/cm$^3$ for the second group (non-heat treated). After 68 cycles, the relative difference in capacities between the two groups was significantly larger. After the 68th cycle, based on an average of 3 cells, the first group (heat treated) showed a specific capacity of 694 mAh/g and a volumetric capacity of 735 mAh/cm$^3$, compared to a specific capacity of only 568 mAh/g and a volumetric capacity of only 579 mAh/cm$^3$ for the second group (non-heat treated). This improved capacity stability during cycling due to the heat treatment step may relate to the improved adhesion and cohesion of the cathode active layer after heat treatment.

Example 12

A cathode active layer was prepared as described in Example 9, except that the resulting cathode with the heat-treated cathode active layer was subjected to only light calendering using a single-nip calender, as described in Example 1. Heat treatment followed by light calendering resulted in three different samples with volumetric densities ranging from 438 to 467 mg/cm$^3$. These solid composite cathodes with light calendering were utilized to form electric current producing cells in a prismatic cell format of about 800 cm$^2$ in area using the components and procedure as described in Example 9. Pressing the cells to produce the prismatic cell format resulted in cathodes with volume densities approximately 20 percent greater than the volume densities measured prior to pressing, or about 550 to 580 mg/cm$^3$. Discharge-charge cycling was done as described in Example 9. After the 5t discharge cycle, based on the average of 3 cells, the specific capacity was 813 mAh/g, and the volumetric capacity was 461 mAh/cm$^3$. At 250 cycles, the specific capacity was 353 mAh/g, and the volumetric capacity was 202 mAh/cm$^3$, for a cell that ceased functioning. After 300 cycles, based on the average of the two remaining cells, the specific capacity was 270 mAh/g, and the volumetric capacity was 152 mAh//cm$^3$. This illustrates that excellent specific capacities may be achieved with only light calendering of the solid composite cathodes of the present invention over as many as 300 discharge-charge cycles of the cells.

While the invention has been described in detail and with reference to specific embodiments thereof, it will be apparent to one skilled in the art that various changes and modifications can be made without departing from the spirit and scope thereof.

What is claimed is:

1. A method of forming a solid composite cathode for use in an electric current producing cell, wherein said method comprises the steps of:
    (a) dispersing or suspending solid materials comprising:
        (i) elemental sulfur; and
        (ii) an electrically conductive material; in a liquid medium to form a liquid mixture;
    (b) casting said liquid mixture formed in step (a) onto a substrate to form a cast layer;
    (c) removing some or all of said liquid medium from said cast layer formed in step (b) to form a dried layer on said substrate;
    (d) melting said elemental sulfur in said dried layer by heating to a temperature above the melting point of said elemental sulfur to form a melt layer; and
    (e) resolidifying said melted elemental sulfur formed in step (d) to form a cathode active layer, wherein the thickness of said cathode active layer of step (e) is at least 8% less than the thickness of said dried layer of step (c) and said elemental sulfur is present in said cathode active layer at a volumetric density of greater than 500 mg/cm$^3$.

2. The method of claim 1, wherein, prior to step (d), said dried layer formed in step (c) is compressed by calendering, and wherein the thickness of said cathode active layer of step (e) is at least 8% less than the thickness of said dried layer of step (c) after said calendering and prior to step (d).

3. The method of claim 1, wherein, after forming said cathode active layer in step (e), there is a further step of compressing said cathode active layer.

4. The method of claim 1, wherein said elemental sulfur is present in an amount of 60 to 95 per cent by weight of said cathode active layer.

5. The method of claim 1, wherein said elemental sulfur is present in an amount of 65 to 90 per cent by weight of said cathode active layer.

6. The method of claim 1, wherein said elemental sulfur is present in an amount of 70 to 85 per cent by weight of said cathode active layer.

7. The method of claim 1, wherein said elemental sulfur is present in said cathode active layer at a volumetric density of greater than 700 mg/cm$^3$.

8. The method of claim 1, wherein said elemental sulfur is present in said cathode active layer at a volumetric density of greater than 1000 mg/cm$^3$.

9. The method of claim 1, wherein said elemental sulfur is present in said cathode active layer at a volumetric density of greater than 1500 mg/cm$^3$.

10. The method of claim 1, wherein said solid materials of step (a) further comprise a sulfur-containing polymer comprising a polysulfide moiety, $S_m$, selected from the group consisting of: covalent —$S_m$— moieties, ionic —$S_m^-$ moieties, and ionic $S_m^{2-}$ moieties, wherein m is an integer equal to or greater than 3.

11. The method of claim 1, wherein said temperature in step (d) is greater than 120° C.

12. The method of claim 1, wherein said temperature in step (d) is greater than 140° C.

13. The method of claim 1, wherein said temperature in step (d) is greater than 160° C.

14. The method of claim 1, wherein said electrically conductive material is selected from the group consisting of: conductive carbons, conductive graphites, electrically conductive polymers, electrically conductive metal chalcogenides, carbon nanofibers, active carbon fibers, metal particles, metal fibers, and metal flakes.

15. The method of claim 1, wherein said liquid mixture formed in step (a) and said cathode active layer formed in step (e) further comprise an organic polymeric binder.

16. The method of claim 1, wherein said liquid mixture formed in step (a) and said cathode active layer formed in step (e) further comprise an ionically conductive material.

17. The method of claim 1, wherein the thickness of said cathode active layer of step (e) is 8% to 22% less than the thickness of said dried layer of step (c).

18. The method of claim 1, wherein the thickness of said cathode active layer of step (e) is at least 14% less than the thickness of said dried layer of step (c).

19. A method of forming a solid composite cathode for use in an electric current producing cell, wherein said method comprises the steps of:
 (a) dispersing or suspending:
  (i) an electroactive sulfur-containing material; and
  (ii) an electrically conductive material; in a liquid medium to form a liquid mixture wherein said liquid mixture does not comprise a polymeric binder;
 (b) casting said liquid mixture formed in step (a) onto a substrate to form a cast layer;
 (c) removing some or all of said liquid medium from said cast layer formed in step (b) to form a dried layer on said substrate;
 (d) melting said electroactive sulfur-containing material in said dried layer by heating to a temperature above the melting point of said electroactive sulfur-containing material to form a melt layer; and
 (e) resolidifying said melted electroactive sulfur-containing material formed in step (d) to form a cathode active layer, wherein the thickness of said cathode active layer of step (e) is at least 8% less than the thickness of said dried layer of step (c) and said electroactive sulfur-containing material is present in said cathode active layer at a volumetric density of greater than 500 mg/cm$^3$, and wherein said cathode active layer does not comprise a polymeric binder.

20. The method of claim 19, wherein, prior to step (d), said dried layer formed in step (c) is compressed by calendering, and wherein the thickness of said cathode active layer of step (e) is at least 8% less than the thickness of said dried layer of step (c) after said calendering and prior to step (d).

21. The method of claim 19, wherein, after forming said cathode active layer in step (e), there is a further step of compressing said cathode active layer.

22. The method of claim 19, wherein said electroactive sulfur-containing material is present in an amount of 60 to 95 percent by weight of said cathode active layer.

23. The method of claim 19, wherein said electroactive sulfur-containing material is present in an amount of 65 to 95 percent by weight of said cathode active layer.

24. The method of claim 19, wherein said electroactive sulfur-containing material is present in an amount of 70 to 95 percent by weight of said cathode active layer.

25. The method of claim 19, wherein said electroactive sulfur-containing material is present in said cathode active layer at a volumetric density of greater than 700 mg/cm$^3$.

26. The method of claim 19, wherein said electroactive sulfur-containing material is present in said cathode active layer at a volumetric density of greater than 1000 mg/cm$^3$.

27. The method of claim 19, wherein said electroactive sulfur-containing material is present in said cathode active layer at a volumetric density of greater than 1500 mg/cm$^3$.

28. The method of claim 19, wherein said electroactive sulfur-containing material comprises elemental sulfur.

29. The method of claim 19, wherein the thickness of said cathode active layer of step (e) is 8% to 22% less than the thickness of said dried layer of step (c).

30. The method of claim 11, wherein the thickness of said cathode active layer of step (e) is at least 14% less than the thickness of said dried layer of step (c).

31. A method of forming a solid composite cathode for use in an electric current producing cell, wherein said method comprises the steps of:
 (a) dispersing or suspending solid materials comprising:
  (i) elemental sulfur; and
  (ii) an electrically conductive material; in a liquid medium to form a liquid mixture wherein said liquid mixture does not comprise an ionically conductive material;
 (b) casting said liquid mixture formed in step (a) onto a substrate to form a cast layer;
 (c) removing some or all of said liquid medium from said cast layer formed in step (b) to form a dried layer on said substrate;
 (d) melting said elemental sulfur in said dried layer by heating to a temperature above the melting point of said elemental sulfur to form a melt layer; and
 (e) resolidifying said melted elemental sulfur formed in step (d) to form a cathode active layer, wherein the thickness of said cathode active layer of step (e) is at least 8% less than the thickness of said dried layer of step (c) and said elemental sulfur is present in said cathode active layer at a volumetric density of greater than 500 mg/cm$^3$, and wherein said cathode active layer does not comprise an ionically conductive material.

32. The method of claim 31, wherein, prior to step (d), said dried layer formed in step (c) is compressed by calendering, and wherein the thickness of said cathode active layer of step (e) is at least 8% less than the thickness of said dried layer of step (c) after said calendering and prior to step (d).

33. The method of claim 31, wherein, after forming said cathode active layer in step (e), there is a further step of compressing said cathode active layer.

34. The method of claim 31, wherein said elemental sulfur is present in an amount of 60 to 95 percent by weight of said cathode active layer.

35. The method of claim 31, wherein said elemental sulfur is present in an amount of 65 to 95 percent by weight of said cathode active layer.

36. The method of claim 31, wherein said elemental sulfur is present in an amount of 70 to 95 percent by weight of said cathode active layer.

37. The method of claim 31, wherein said elemental sulfur is present in said cathode active layer at a volumetric density of greater than 700 mg/cm$^3$.

38. The method of claim 31, wherein said elemental sulfur is present in said cathode active layer at a volumetric density of greater than 1000 mg/cm$^3$.

39. The method of claim 31, wherein said elemental sulfur is present in said cathode active layer at a volumetric density of greater than 1500 mg/cm$^3$.

40. The method of claim 31, wherein the thickness of said cathode active layer of step (e) is 8% to 22% less than the thickness of said dried layer of step (c).

41. The method of claim 31, wherein the thickness of said cathode active layer of step (e) is at least 14% less than the thickness of said dried layer of step (c).

42. A method of forming an electric current producing cell, wherein said method comprises the steps of:
 (i) providing an anode;
 (ii) providing a solid composite cathode, wherein said cathode is formed by a method comprising the steps of:
  (a) dispersing or suspending solid materials comprising:
   (i) elemental sulfur; and
   (ii) an electrically conductive material; in a liquid medium to form a liquid mixture;
  (b) casting said liquid mixture formed in step (a) onto a substrate to form a cast layer;

(c) removing some or all of said liquid medium from said cast layer formed in step (b) to form a dried layer on said substrate;
(d) melting said elemental sulfur in said dried layer by heating to a temperature above the melting point of said elemental sulfur to form a melt layer; and
(e) resolidifying said melted elemental sulfur formed in step (d) to form a cathode active layer, wherein the thickness of said cathode active layer of step (e) is at least 8% less than the thickness of said dried layer of step (c) and said elemental sulfur is present in said cathode active layer at a volumetric density of greater than 500 mg/cm$^3$; and (iii) interposing an electrolyte between said anode and said cathode.

43. The method of claim 42, wherein the thickness of said cathode active layer of step (e) is 8% to 22% less than the thickness of said dried layer of step (c).

44. The method of claim 42, wherein the thickness of said cathode active layer of step (e) is at least 14% less than the thickness of said dried layer of step (c).

45. A method of forming an electric current producing cell, wherein said method comprises the steps of:
(i) providing an anode;
(ii) providing a solid composite cathode, wherein said cathode is formed by a method comprising the steps of:
(a) dispersing or suspending:
(i) an electroactive sulufr-containing material; and
(ii) an electrically conductive material; in a liquid medium to form a liquid mixture wherein said liquid mixture does not comprise a polymeric binder;
(b) casting said liquid mixture formed in step (a) onto a substrate to form a cast layer;
(c) removing some or all of said liquid medium from said cast layer formed in step (b) to form a dried layer on said substrate;
(d) melting said electroactive sulfur-containing material in said dried layer by heating to a temperature above the melting point of said electroactive sulfur-containing material to form a melt layer; and
(e) resolidifying said melted electroactive sulfur-containing material formed in step (d) to form a cathode active layer, wherein the thickness of said cathode active layer of step (e) is at least 8% less than the thickness of said dried layer of step (c) and said electroactive sulfur-containing material is present in said cathode active layer at a volumetric density of greater than 500 mg/cm$^3$, and wherein said cathode active layer does not comprise a polymeric binder; and
(iii) interposing an electrolyte between said anode and said cathode.

46. The method of claim 45, wherein said electroactive sulfur-containing material comprises elemental sulfur.

47. The method of claim 45, wherein the thickness of said cathode active layer of step (e) is 8% to 22% less than the thickness of said dried layer of step (c).

48. The method of claim 41, wherein the thickness of said cathode active layer of step (e) is at least 14% less than the thickness of said dried layer of step (c).

49. A method of forming an electric current producing cell, wherein said method comprises the steps of:
(i) providing an anode;
(ii) providing a solid composite cathode, wherein said cathode is formed by a method comprising the steps of:
(a) dispersing or suspending solid materials comprising:
(i) elemental sulfur; and
(ii) an electrically conductive material; comprise an ionically conductive material;
(b) casting said liquid mixture formed in step (a) onto a substrate to form a cast layer;
(c) removing some or all of said liquid medium from said cast layer formed in step (b) to form a dried layer on said substrate;
(d) melting said elemental sulfur in said dried layer by heating to a temperature above the melting point of said elemental sulfur to form a melt layer; and
(e) resolidifying said melted elemental sulfur formed in step (d) to form a cathode active layer, wherein the thickness of said cathode active layer of step (e) is at least 8% less than the thickness of said dried layer of step (c) and said elemental sulfur is present in said cathode active layer at a volumetric density of greater than 500 mg/cm$^3$, and wherein said cathode active layer does not comprise an ionically conductive material; and
(iii) interposing an electrolyte between said anode and said cathode.

50. The method of claim 49, wherein the thickness of said cathode active layer of step (e) is 8% to 22% less than the thickness of said dried layer of step (c).

51. The method of claim 49, wherein the thickness of said cathode active layer of step (e) is at least 14% less than the thickness of said dried layer of step (c).

* * * * *